United States Patent [19]
Ikeda

[11] Patent Number: 5,708,586
[45] Date of Patent: Jan. 13, 1998

[54] COMPUTERIZED NUMERICAL CONTROL APPARATUS FOR CORRECTING DYNAMIC ERROR AND METHOD THEREFOR

[75] Inventor: Mutsumi Ikeda, Tokyo, Japan

[73] Assignee: Mitsubishi Denki Kabushiki Kaisha, Tokyo, Japan

[21] Appl. No.: 519,944

[22] Filed: Aug. 29, 1995

[30] Foreign Application Priority Data

Aug. 31, 1994  [JP]  Japan ................................. 6-207108
Aug. 18, 1995  [JP]  Japan ................................. 7-210555

[51] Int. Cl.$^6$ ...................... G05B 19/18; G05B 19/4103
[52] U.S. Cl. ..................... 364/474.28; 364/474.3; 364/474.35; 364/474.31; 364/474.11; 364/474.28; 364/474.29; 318/568.11; 318/568.22; 318/573; 318/574
[58] Field of Search ................ 364/474.28, 474.01, 364/474.29, 474.11, 474.3, 474.31, 474.35, 193, 191, 474.22, 167.01; 318/569, 573, 568.1, 571, 632, 567, 561, 568.22, 616, 625, 562, 600, 603, 609, 610; 395/800

[56] References Cited

U.S. PATENT DOCUMENTS

| | | | |
|---|---|---|---|
| 4,053,819 | 10/1977 | Matsumoto | 318/569 |
| 4,061,953 | 12/1977 | Matsumoto | 318/573 |
| 4,095,158 | 6/1978 | Matsumoto | 318/603 |
| 4,179,602 | 12/1979 | Maruyama et al. | 318/573 |
| 4,321,516 | 3/1982 | Ohtsuka | 318/571 |
| 4,603,286 | 7/1986 | Sakano | 318/615 |
| 5,019,763 | 5/1991 | Komatsu | 318/571 |
| 5,153,490 | 10/1992 | Ueta et al. | 318/571 |
| 5,253,501 | 10/1993 | Spath | 72/167 |
| 5,262,847 | 11/1993 | Rodriguez et al. | 358/21 R |
| 5,459,520 | 10/1995 | Sasaki | 348/445 |

FOREIGN PATENT DOCUMENTS

| | | |
|---|---|---|
| 62-190504 | 8/1987 | Japan . |
| 63-30909 | 2/1988 | Japan . |
| 63-233405 | 9/1988 | Japan . |
| 36707 | 1/1991 | Japan . |
| 340004 | 2/1991 | Japan . |
| 4302007 | 10/1992 | Japan . |
| 519825 | 1/1993 | Japan . |
| 566815 | 3/1993 | Japan . |

Primary Examiner—Emanuel T. Voeltz
Assistant Examiner—Cuong H. Nguyen
Attorney, Agent, or Firm—Sughrue,Mion,Zinn,Macpeak & Seas, PLLC

[57] ABSTRACT

In the numerical control system according to the present invention, analysis data from an analyzing means is given to a distributing means, at least one of addition for a positional instruction, addition for a speed instruction, and addition for a current instruction is computed according to analysis data from the analyzing means, and the computed addition is added at a desired timing to a specified output from a distributing means or other subsequent means.

17 Claims, 17 Drawing Sheets

FIG. 2C

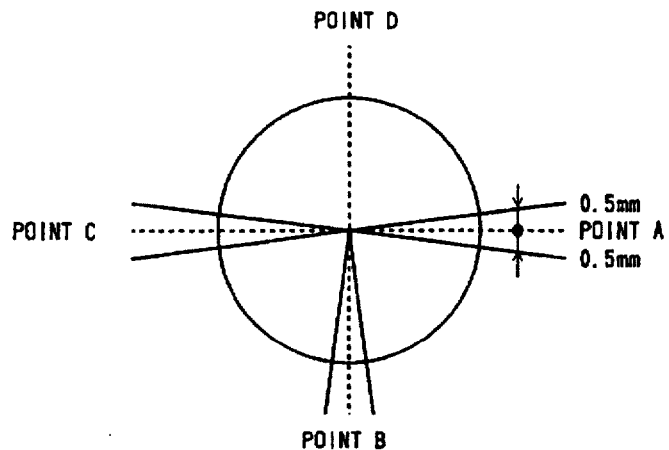

FIG. 2D

CURRENT ADDITION DATA 1
| REMAINING DISTANCE AT START |
| REMAINING DISTANCE IN END |
| ADDITION FOR CURRENT INSTRUCTION IN X-AXIAL DIRECTION |
| ADDITION FOR CURRENT INSTRUCTION IN Y-AXIAL DIRECTION |

CURRENT ADDITION DATA 2
| REMAINING DISTANCE AT START |
| REMAINING DISTANCE IN END |
| ADDITION FOR CURRENT INSTRUCTION IN X-AXIAL DIRECTION |
| ADDITION FOR CURRENT INSTRUCTION IN Y-AXIAL DIRECTION |

CURRENT ADDITION DATA 3
| REMAINING DISTANCE AT START |
| REMAINING DISTANCE IN END |
| ADDITION FOR CURRENT INSTRUCTION IN X-AXIAL DIRECTION |
| ADDITION FOR CURRENT INSTRUCTION IN Y-AXIAL DIRECTION |

CURRENT ADDITION DATA 4
| 0 |
| |
| |
| |

FIG. 3C

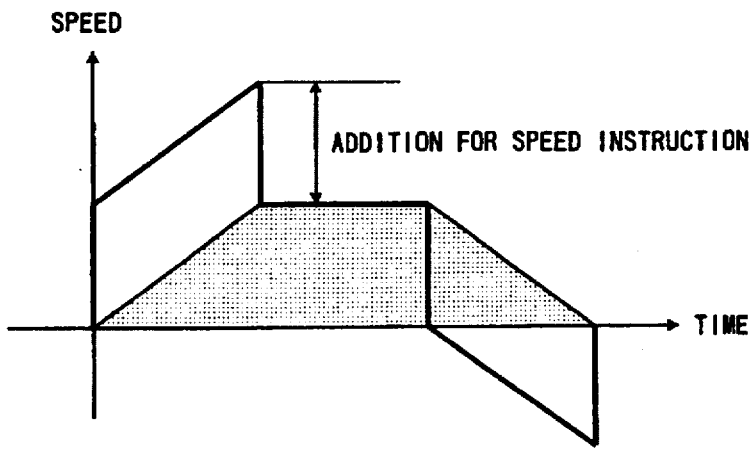

FIG. 3D

CURRENT ADDITION DATA 1

| REMAINING DISTANCE AT START |
| REMAINING DISTANCE IN END |
| ADDITION FOR CURRENT INSTRUCTION IN X-AXIAL DIRECTION |
| ADDITION FOR CURRENT INSTRUCTION IN Y-AXIAL DIRECTION |

CURRENT ADDITION DATA 2

| REMAINING DISTANCE AT START |
| REMAINING DISTANCE IN END |
| ADDITION FOR CURRENT INSTRUCTION IN X-AXIAL DIRECTION |
| ADDITION FOR CURRENT INSTRUCTION IN Y-AXIAL DIRECTION |

CURRENT ADDITION DATA 3

| 0 |
|   |
|   |
|   |

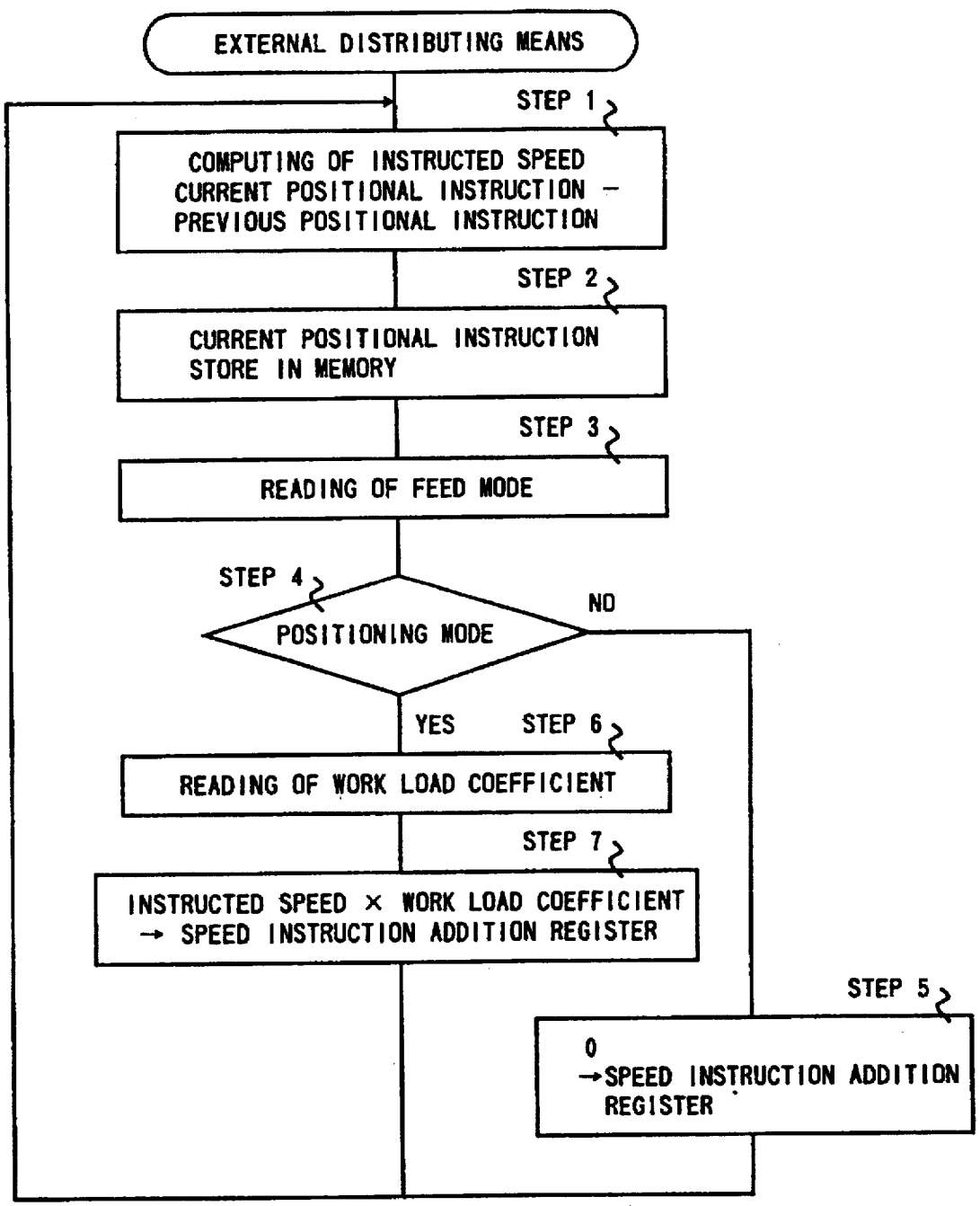

COMPUTERIZED NUMERICAL CONTROL APPARATUS FOR CORRECTING DYNAMIC ERROR AND METHOD THEREFOR

FIELD OF THE INVENTION

The present invention relates to a numerical control method and an apparatus for the same, and especially to generation of instructions for correction required for high speed and high precision machining with an NC machining tool.

BACKGROUND OF THE INVENTION

FIG. 10 is a block diagram illustrating a conventional type of numerical control apparatus.

Description is made hereinafter for the conventional technology with reference to the related drawings.

Generally a numerical control apparatus analyzes a machining program and generates analysis data with an analyzing means 10. For instance, the numerical control apparatus analyzes a machining program of G1 X10.0 Y10.0 F100; and generates analysis data of linear interpolation, travel in the X-axial direction of 10 mm, travel in the Y-axial direction of 10 mm, a speed of 100 mm/minute, a length of movement of 14, 142 mm. This analysis data is distributed by a distributing means 5, and positional instructions in each axial direction is outputted. A positional control means 4 outputs a speed instruction according to the positional instruction as well as to positional feedback. A speed control means 3 outputs a current instruction according to the speed instruction as well as to speed feedback. A current control means 2 receives the current instruction inputted thereto and drives an electric motor 1. A detector 9 connected to the electric motor 1 detects a speed and a position and feeds back the data.

For the reasons as described above, generally apparatuses from an analyzing means up to a detector are sold in a set as a numerical control apparatus 12.

A problem for high precision machining in a numerical control apparatus having the configuration as described above is correction of a dynamic error in a machine system. A dynamic error in a machine system is generated due to mechanical distortion caused by change in friction coefficient, a spring coefficient of a machine, or viscous resistance or the like.

This error can be corrected by supplying data for a correction rate to a current control means, or a speed control means, or a positional control means in the numerical control apparatus. However, as a general purpose numerical control unit 12 does not have a correcting function most suited to a particular machine system nor a correcting function specified to each user, so that a preprocessor 11 is provided in addition to a general purpose numerical control apparatus to modify an instruction.

For instance, as shown in FIG. 11, a frictional force increases because a speed in the Y-axial direction once decreases at a border between quadrants in a semi-circular movement on an XY plane, and movement in the Y-axial direction becomes slower, so a precision of an arc formed form drops. For this reason, the error is corrected by modifying an instructed curve to a curve 31.

An example shown in FIG. 12 (A&B), positioning from point A to point B is executed, but a time required until completion of positioning becomes longer due to a delay in response of a machine. So the time required for positioning is shortened by modifying an instruction so that acceleration will increase with an excessive instruction such as an instruction 32.

Also in an example shown in FIG. 13, rigidity in the X-axial direction and that in the Y-axial direction are different from each other, so that an oval track is provided as a response to an instruction for a circle. So the instructed curve is deformed to an oval form like a curve 33 for correcting the error.

Thus an error in a machine system can be corrected by modifying an instruction.

This modification can be executed, making use of the relation that differentiation of a positional instruction is a speed instruction and differentiation of a speed instruction is a current instruction, by adding integration of an integrated correction rate when it is necessary to correct a current instruction, or an integration of a correction rate when it is necessary to correct a speed instruction, or a correction rate when it is necessary to correct a positional instruction respectively to a positional instruction.

To execute computing for correction, in the conventional type of numerical control apparatus, an external analyzing means 28, an external correction distributing means 29, and a program preparing means 30 are added in a set as a preprocessor 11 for modifying an instruction in the upstream of the numerical control apparatus, so that a machining program is analyzed by the external analyzing means 28, an instructed curve is deformed and distributed by the external correction distributing means 29, and the machining program is rewritten by the program preparing means 30 so that the program can be analyzed by the analyzing means 10.

It should be noted that a personal computer, a CAM unit or the like is used as the preprocessor 11.

In addition, some types of general purpose numerical control apparatus 12 incorporate a simple correcting function in the positional control means 4, speed control means 3, and current control means 2 by taking thereinto a portion of functions of the preprocessor 12. In a case of a curve shown in FIG. 11, some types of general purpose numerical control apparatus incorporate in the current control means 2 a function to increment a current instruction when a speed in the Y-axial direction changes at a border between quadrants. In a case of a straight line as shown in FIGS. 12A and 12B, some types of general purpose numerical control apparatus incorporate a function in the speed control means 3 a function to add differentiation of a positional instruction to a speed instruction.

The conventional type of numerical control apparatus has the configuration as described above, so that complicated computing for correction as described above must be executed at a high speed in the preprocessor, and also high speed data transfer from the preprocessor 11 to the general purpose numerical control apparatus 12 is required, and for this reason the system becomes disadvantageously expensive.

Furthermore a control cycle in speed control is generally longer than a control cycle in current control, and a control cycle in positional control is longer than a control cycle in speed control. However, correction in a preprocessor is executed at a cycle for positional control, so that precision in correction disadvantageously drops.

Also general purpose numerical control apparatuses incorporating a simple correcting function in the positional control means 4, speed control means 3, and current control means 2 respectively by taking thereinto a portion of functions of the preprocessor 11 do not require any additional apparatus and nor is disadvantageous in terms of cost, but have the disadvantages that a correcting function most suited to a particular machine or specified to each user can not be realized, or that, although a cycle of positional control, speed control, or current control must be made as short as possible for providing high speed and high precision control, there occurs a contradiction that a processing load increases and a control cycle becomes longer because of incorporation of a correcting function, and as a result only a very simple function can be realized.

For instance, in a case of the curve shown in FIG. 11, although it is better to change a correction rate according to a curvature of a circle or a position of a machine, but this determination requires complicated computing. In a case of the straight line shown in FIGS. 12(A&B), a machine response varies according to weight of a work or an operating mode such as accelerating or decelerating, so that it is required to change a speed correction pattern, but also this operation requires substantially complicated computing. Also computing for positional control, speed control, and current control is executed independently for each axial direction, so that computing must be executed by taking into account a track of movement, which is very difficult.

SUMMARY OF THE INVENTION

It is an object of the present invention to provide a numerical control method enabling high precision correction and an apparatus for the same.

Other objects and features of this invention will become understood from the following description with reference to the accompanying drawings.

As described above, with the present invention, analysis data from the analyzing means is given to the distributing means, and at least one of addition for positional instruction, addition for speed instruction, and addition for current instruction is computed according to the analysis data from the analyzing means, and the computed addition is added at a desired time to a specified output from the distributing means and from subsequent means thereafter for controlling the electric motor, so that distortion of an instruction or user's own correction for high-speed and high-precision machining suited for a particular mechanical system can be executed in the internal section of the numerical control apparatus, and high-speed data transfer from the preprocessing apparatus to the numerical control apparatus is not required anymore.

When executing a positional correction, if a positional correction rate is within a specified range, correction can be executed only by computing a function for curve interpolation and a positional correction rate which are essential of the numerical control apparatus, and such a large amount of computing that analysis data of an instructed track by approximating a curve obtained by adding addition for the positional instruction and a positional instruction with a large amount of minute straight lines is prepared is not required anymore, and amount of computing can be largely reduced as compared to those in the conventional type thereof.

When executing speed correction, after addition for speed instruction has been converted to a positional instruction by integration thereof, such complicated computing that an instructed track should be distorted is not required anymore, and also when executing current correction, such complicated computing that addition for current instruction is integrated and converted to a speed instruction, which is furthermore integrated and converted to a positional instruction, then an instructed track is distorted is not required anymore, and for this reason, in these cases computing correction can be more simplified as compared with those in the conventional type thereof.

When computing at least one of addition for the positional instruction, addition for the speed instruction, and addition for the current instruction, analysis data from the analyzing means is used, so that a means for computing at least one of addition for the positional instruction, addition for the speed instruction, and addition for the current instruction does not required anymore to have an analyzing function similar to the analyzing means together therewith.

For this reason, in the numerical control apparatus, cost reduction and compact size thereof can be achieved as compared to the conventional type of apparatus, and as far as a speed or current correction is concerned, higher precision correction than that in the conventional type thereof becomes possible.

With the present invention, analysis data from the analyzing means is given to the distributing means, a range of addition for at least one of the positional instruction, the speed instruction, and the current instruction is computed on the instructed track according to the analysis data from the analyzing means, at least one of addition for the positional instruction, addition for the speed instruction, and addition for the current instruction is computed, and a current position is compared to the range of addition, and if it is determined that the current position is within a range of addition, the computed addition described above is added to a specified output from the distributing means or from sequence means thereafter for controlling the electric motor, so that the position, speed, and current can easily be corrected by only specifying addition and a range for addition for high-speed and high-precision machining.

With this feature, a correction rate can be changed in a group of analysis data, and even when a plurality of analysis data has to be prepared in the above-mentioned invention, a group of analysis data can be sufficient for them.

For this reason, correction with less computing amount as compared with those in the first and the fourth inventions can be realized in an equivalent level thereto, so that correction in a level equivalent to those in the above-mentioned inventions can be performed based on the conditions of further cost reduction and higher-speed as compared with those in the above-mentioned inventions.

With the present invention, specification of a range of addition is executed by specifying an interpolated remaining distance, so that a range to be corrected can be specified with a constant level to the track on which the apparatus passes around the same machinery position for a plurality numbers of times like passing around an arc shape in addition to effects each of the above-mentioned inventions.

With the present invention, a registering means for registering an internal analysis means between the analyzing means and the distributing means in terms of software is provided, so that in addition to the above-mentioned inventions, an internal analyzing means in which an optimal correction to a particular machine is possible can easily be registered in the numerical control apparatus.

With the present invention, a positional instruction is given to the positional control means by distributing an instructed track according to analysis data from the analyzing means, addition for the current instruction divided in a processing cycle of the current control means is computed, and addition for the current instruction computed above is added to an output from the speed control means in a processing cycle of the current control means for controlling the electric motor, so that distortion of the instruction or user's own correction for high-speed and high-precision machining suited for a particular mechanical system can be executed in the internal section of the numerical control apparatus, and a preprocessing apparatus for distorting an instructed track is not required to be provided, and also a high-speed data transfer from the preprocessing apparatus to the numerical control apparatus is not required anymore.

Such complicated computing that addition for the current instruction is converted to a speed instruction by integration, which is further integrated and is converted to a positional instruction, then an instructed track is distorted is not required anymore, and for this reason computing for correction can be more simplified as compared with those in the conventional type of apparatus.

When addition for the current instruction is computed, analysis data from the analyzing means is used, so that an analyzing function equivalent to the analyzing means is not required anymore to be provided in a means for computing addition for the current instruction together therewith.

Correction can be executed in a processing cycle of the current control means faster than a cycle of the positional control means.

For this reason, cost reduction and compact size thereof can be achieved as compared with those in the conventional type of the apparatus, and also higher precision current correction can be achieved as compared with those in the above-mentioned inventions.

With the present invention, a positional instruction is given to the positional control means by distributing an instructed track according to analysis data from the analyzing means, and addition for the speed instruction divided in a processing cycle of the speed control means is computed, and addition for the speed instruction computed above therein is added to an output from the positional control means for controlling the electric motor, so that distortion of an instructed track or user's own correction for high speed and high precision machining suited for a particular mechanical system can be executed in the internal section of the numerical control apparatus, and a preprocessing apparatus for distorting an instructed track is not required to be provided, and also a high speed data transfer from the preprocessing apparatus to the numerical control apparatus is not required anymore.

Such complicated computing that addition for the speed instruction integrated is converted to a positional instruction, then an instructed track is distorted is not required anymore to be executed, thus computing for correction being more simplified as compared with those in the conventional type thereof.

Correction in a processing cycle of the speed control means faster than a cycle of the positional control means can be executed.

For this reason, cost reduction and compact size thereof can be achieved as compared with those in the conventional type of apparatus, and higher precision speed correction can also be achieved as compared with those in the above-mentioned inventions.

With the present invention, a positional instruction is given to the positional control means by distributing an instructed track according to analysis data from the analyzing means, addition for the positional instruction divided in a processing cycle of the positional control means, and addition for the positional instruction computed above therein is added to an output before entering the positional control means in a processing cycle of the positional control means for controlling the electric motor, so that distortion of the instruction or user's own correction for high speed and high precision machining suited for a particular mechanical system can be executed in the internal section of the numerical control apparatus, and a preprocessing apparatus for distorting an instructed track is not required to be provided, and a high speed data transfer from the preprocessing apparatus to the numerical control apparatus is not required anymore.

Correction can be executed only by computing a curve interpolating function and a positional correction rate which are essential of the numerical control apparatus in a range where a positional correction is constant, and a large amount of computing that analysis data of an instructed track by approximating a curve obtained by adding addition for the positional instruction and a positional instruction with a large amount of minute straight lines is prepared is not required anymore, and for this reason an amount of computing can largely be reduced as compared with those in conventional type thereof.

Correction can be executed in a processing cycle of the speed control means faster than a cycle of the distributing means.

For this reason, cost reduction and compact size thereof can be achieved as compared with those in the conventional type of apparatus, and a higher precision positional correction can also be achieved as compared with those in the above-mentioned inventions.

Furthermore, with the present invention, a registering means for registering an external distributing means between the analyzing means and the positional control means in terms of software is provided, so that in addition to effects of any of the above-mentioned inventions, an external distributing means where an optimal correction to a particular machine is possible can easily be registered in the numerical control apparatus.

BRIEF DESCRIPTION OF THE DRAWINGS

FIGS. 2A to 2D are flow charts and explanatory views showing operations for current correction according to Embodiment 1 of the present invention;

FIGS. 3A to 3D are flow charts and explanatory views showing operations for speed correction according to Embodiment 1 of the present invention;

FIG. 8 is a flow chart illustrating operations for speed correction according to Embodiment 2 of the present invention;

DETAILED DESCRIPTION OF THE PREFERRED INVENTION

Description is made for Embodiment 1 of the present invention with reference to FIGS. 1 to 4. It should be noted that this embodiment relates to inventions as described in claims 1 to 7.

Figure 1:
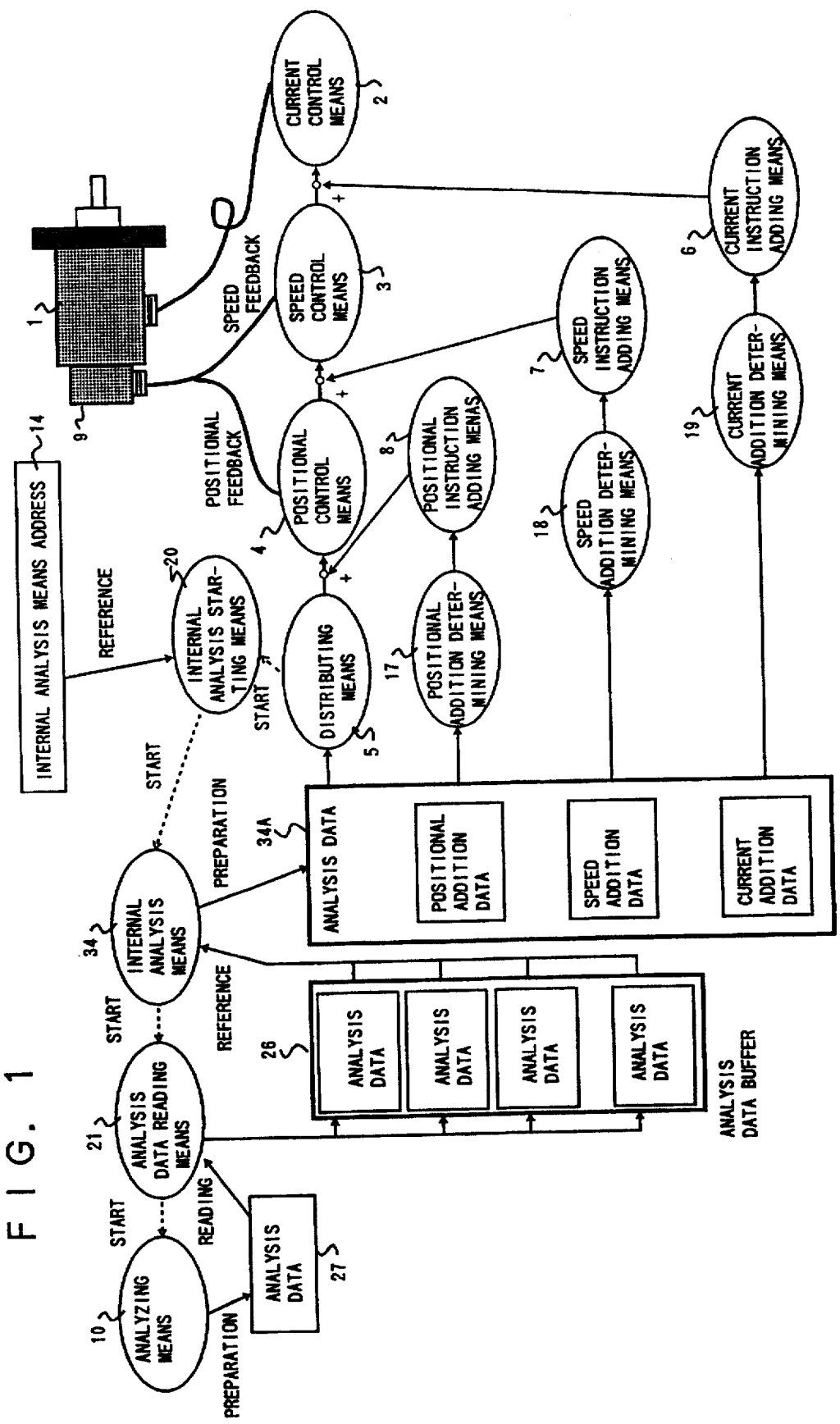
FIG. 1 is a processing block diagram of Embodiment 1 of the present invention.

Namely in this embodiment, as shown in FIG. 1, provided inside the numerical control apparatus are an analysis data reading means 21, an analysis data buffer 26, an internal analyzing means 34, a buffer 34A for the internal analyzing means, an internal analysis starting means 20, an internal analysis registering means 14, a positional instruction addition determining means 17, a positional instruction adding means 8, a speed instruction addition determining means 18, a speed instruction adding means 7, a current instruction addition determining means 19, and a current instruction adding means 6.

Also the internal analyzing means 34 is registered by the internal analysis registering means 14 in terms of software between the analyzing means 10 and the distributing means.

It should be noted that each means above is provided by software. Next description is made for functions and operations of each element.

Namely, the distributing means 5 starts operations of the internal analysis starting means 20 when analysis data is required (for instance when a machine start button is pressed for machining).

The internal analysis starting means 20 starts operation of the internal analyzing means 34 referring to an address of the internal analyzing means registered in the internal analysis registering means 14.

The internal analyzing means 34 refers the analysis data buffer 26 for preparing analysis data to be delivered to the distributing means 5, but if reference data is short, starts operations of the analysis data reading means 21.

The analysis data reading means 21 starts operations of the analyzing means to make the analyzing means 10 prepare analysis data 27. Furthermore the prepared analysis data 27 is set in the analysis data buffer 26.

The internal analyzing means 34 prepares positional instruction addition data, speed instruction addition data, or current instruction addition data by referring to analysis data in the analysis data buffer 26 and set the data in the buffer 34A for the internal analyzing means. Detailed description for preparation of the positional instruction addition data, speed instruction addition data, and current instruction addition data is made later.

This internal analyzing means 34 sets analysis data stored in the analysis data buffer 26, namely the analysis data obtained through analysis by the analyzing means 10 as analysis data to be delivered to the distributing means 5 in the buffer 34A for the internal analyzing means.

In other words, the internal analyzing means 34 executes only the computing as described above, and does not computing like that in the conventional type of preprocessor 11 in which, after computing is executed for adding integration of integrated correction rate when it is necessary to correct a current instruction, integration of a correction rate when it is necessary to correct a speed instruction, or a correction data when it is necessary to correct a positional instruction respectively to a positional instruction, it is necessary to rewrite the instructions into a machining program which the analyzing means 10 can analyze.

The distributing means 5 executes distribution according to an instructed track as well as an instructed speed by referring to analysis data, and outputs a positional instruction to the positional control means 4.

The positional instruction addition determining means 17 refers to positional instruction addition data, and, if the current interpolated remaining distance is within a range of addition, outputs the positional instruction addition to the positional instruction adding means 8.

The positional instruction adding means 8 adds a positional instruction outputted from the distributing means 5 to a positional instruction addition outputted from the positional instruction addition determining means 17, and outputs the sum to the positional control means 4.

The positional control means 4 computes a speed instruction from a difference between a positional instruction and a positional feedback from the detector 9, and outputs the result to the speed control means 3.

The speed instruction addition determining means 18 refers to speed instruction addition data, and, if the current interpolated remaining distance is within a range of addition, outputs addition for the speed instruction to the speed instruction adding means 7.

The speed instruction adding means 7 adds a speed instruction outputted from the positional control means 4 to speed instruction addition outputted from the speed instruction addition determining means 18, and outputs the sum to the speed control means 3.

The speed control means 3 computes a current instruction from a difference between a speed instruction and speed feedback from the detector 9, and outputs the result to the current control means 2.

The current instruction addition determining means 19 refers current instruction addition data, and, if the current interpolated remaining distance is within a range of addition, outputs the current instruction addition to the current instruction adding means 6.

The current instruction adding means 6 adds a current instruction outputted from the speed control means 3 to a current instruction addition outputted from the current instruction addition determining means 19, and output the sum to the current control means 2.

The current control means 2 controls a current to be given to the electric motor 1 according to a current instruction.

The electric motor 1 drives a machine with its torque.

The detector 9 detects a position and a speed of the electric motor 1 and feeds back the data to the positional control means 4 and the speed control means 3.

FIGS. 2A to 2D show the cases where change in friction generated due to the fact that a moving speed in an axial direction in which movement is reverted near a border between quadrants in an instruction for circular movement get near zero or lost motion due to such a reason as elastic deformation is corrected.

In this case, a current is corrected by 10% in a range of around 0.5 mm before and after a vertex of an arc with a radius of R mm.

FIG. 2C shows a range of correction.

FIG. 2D shows a memory allocation for current instruction addition data set in analysis data. Herein current instruction addition data 1, 2, 3 are allocated as data for three vertexes (point A, point B, and point C). Contents of current instruction addition data 4 is zero, and each data indicating that the current instruction addition data is complete with 3. It should be noted that machining is started at point D.

Figure 2A:
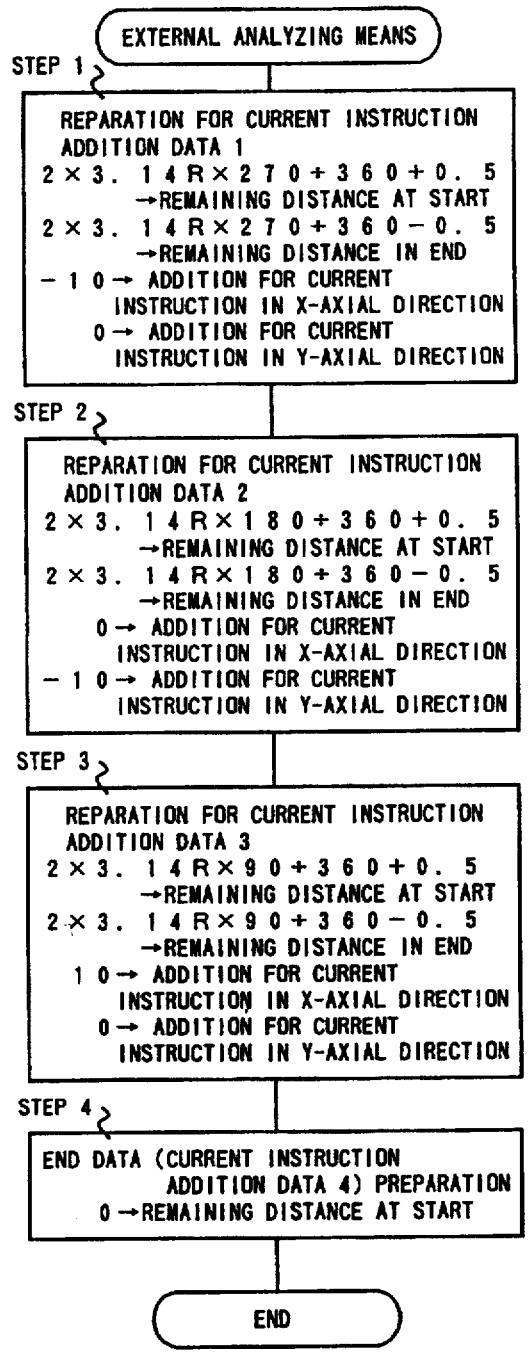

FIG. 2A is a flow chart for generation of current instruction addition data with the internal analyzing means 34.

Step 1

Current instruction addition data 1 is generated as current instruction addition data at point A. A remaining distance at start is (2πR)*270/360+0.5, a remaining distance in end is (2πR)*270/360−0.5, addition for a current instruction in the X-axial direction is −10, and addition for a current instruction in the Y-axial direction is 0.

Step 2

Current instruction addition data 2 is generated as current instruction addition data at point B. A remaining distance at start is (2πR)*180/360+0.5, a remaining distance in end is (2πR)*180/360−0.5, addition for a current instruction in the X-axial direction is 0, and addition for a current instruction in the Y-axial direction is −10.

Step 3

Current instruction is generated at current instruction addition data at point C. A remaining distance at start is (2πR)*90/360+0.5, a remaining distance in end is (2πR)*90/360−0.5, addition for a current instruction in the X-axial direction is 10, and addition for a current instruction in the Y-axial direction is 0.

Step 4

End data is written in the current instruction addition data 4. End data is generated by setting 0 in the remaining distance at start.

Figure 2B:
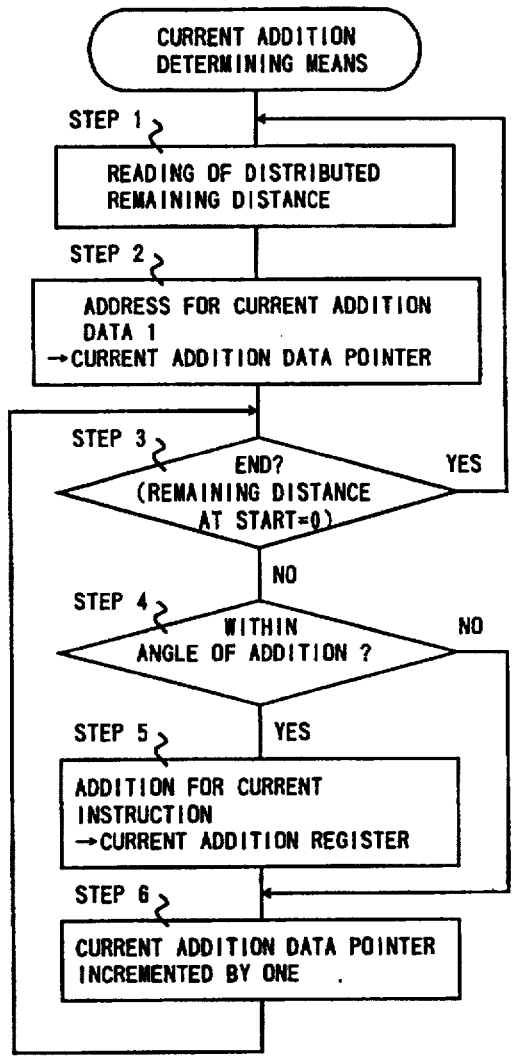

FIG. 2B is a flow illustrating operations of the current instruction addition determining means 19.

Step 1

A distributed remaining distance is read.

Step 2

An address for current instruction addition data 1 is set in a current instruction addition data read pointer.

Step 3

The remaining distance at start is compared to 0, and end of operation is determined if operation has come to the end, system control branches to step 1.

Step 4

The distributed remaining distance is compared to the remaining distance at start as well as to the remaining distance in end. If the distributed remaining distance is not more than the remaining distance at start and not less than the remaining distance in end, it is within a range of addition. Otherwise, system control branches to step 6.

Step 5

Addition for a current instruction in the X-axial direction is copied to the X-axial current instruction addition register.

Also addition for a current instruction in the Y-axial direction is copied to the Y axial current instruction addition register. Contents of the current instruction addition register is added by the current instruction adding means to a current instruction and the sum is outputted to the current control means 2.

Step 6

The read pointer for current instruction addition data is incremented by one. System control branches to step 3.

Figure 3A:
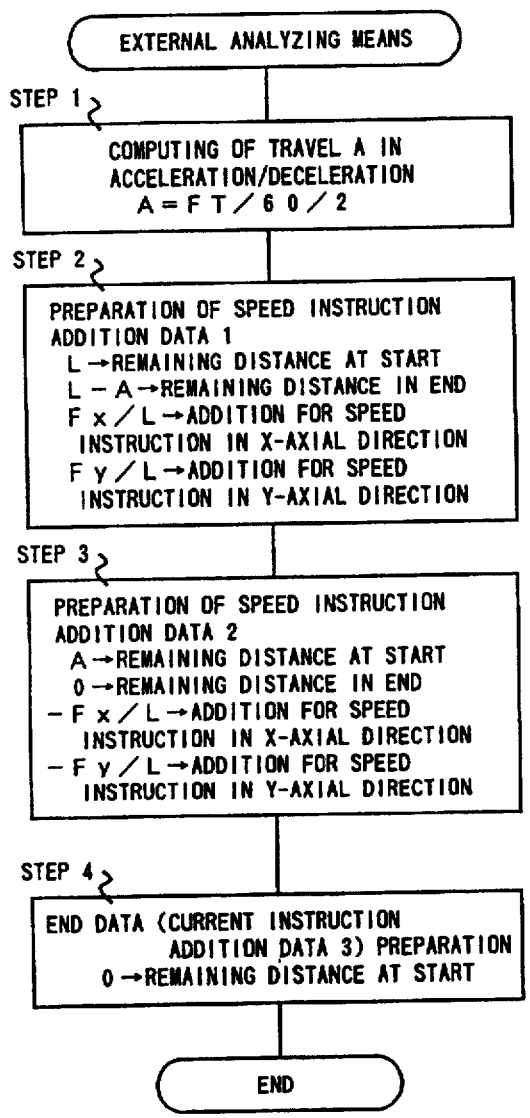
Figure 3B:
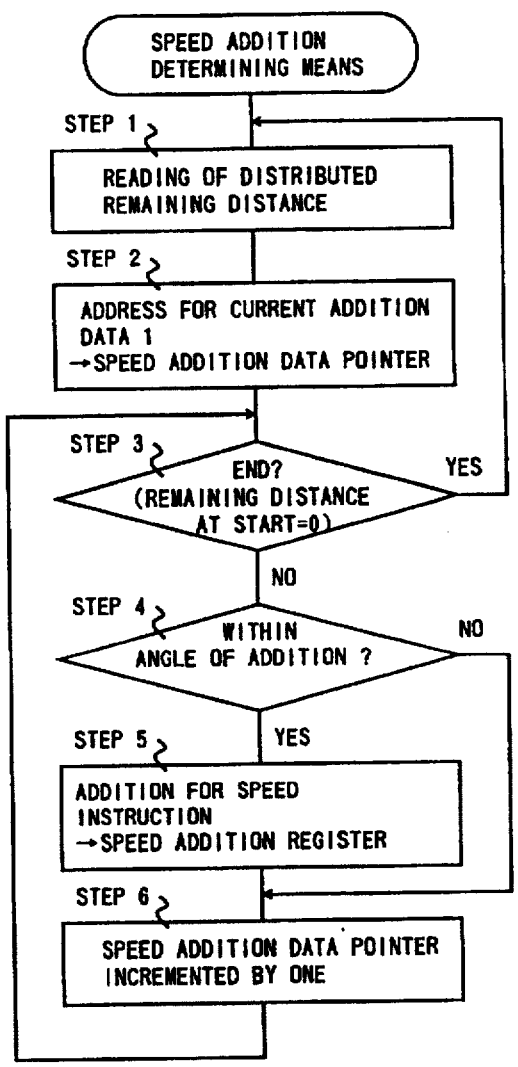

FIGS. 3A to 3C show the cases where a time required for positioning is reduced by applying speed feed forward.

In this case, a speed of F mm/minute is corrected in a range of an acceleration/deceleration time T sec for linear positioning. The straight line is a vector of (X, Y).

FIG. 3C shows a range of speed correction and a wave form of a speed instruction.

FIG. 3D shows memory allocation for speed instruction addition data set in analysis data. Herein speed instruction addition data 1, 2 are allocated as data for acceleration and deceleration respectively. Contents of speed instruction addition data 3 is 0, and an end data indicating that the speed instruction data is complete with 2.

FIG. 3A is a flow chart for generation of speed instruction addition data by the internal analyzing means 34.

Step 1

A travel A mm in acceleration and deceleration is computed. A=FT/60/2.

Step 2

Speed instruction addition data 1 is generated as speed instruction addition data for acceleration. Herein a remaining distance at start is L, a remaining distance in end is L−A, addition for a speed instruction in the X-axial direction is Fx/L, and addition for a speed instruction in the Y-axial direction is Fy/L.

Step 3

Speed instruction addition data 2 is generated as speed instruction addition data for deceleration. A remaining distance at start is A, a remaining distance in end is 0, addition for speed instruction in the X-axial direction is −Fx/L, and addition for speed instruction in the Y-axial direction is −Fy/L.

Step 4

End data is written in speed instruction addition data 3. The end data is generated by setting 0 in the remaining distance at start.

FIG. 3B is a flow illustrating operations of the speed instruction addition determining means 18.

Step 1

A distributed remaining distance is read.

Step 2

An address for speed instruction addition data 1 is set in a read pointer for speed instruction addition data.

Step 3

The remaining distance at start is compared to 0, and end of operation is determined. If operation has come to the end, system control branches to step 1.

Step 4

The distributed remaining distance is compared to the remaining distance at start as well as to a remaining distance in end. If the distributed remaining distance is not more than the remaining speed at start and not less than the remaining distance in end, it is within a range of addition. Otherwise system control branches to step 6.

Step 5

Addition for a speed instruction in the X-axial direction is copied to the X-axial speed instruction addition register. Also addition for a speed instruction in the Y-axial direction is copied to the Y-axial speed instruction addition register. Contents of the speed instruction adding means to a speed instruction and the sum is outputted to the speed control means 3.

Step 6

A read pointer for speed instruction addition data is incremented by one. System control branches to step 3.

Figure 4A:
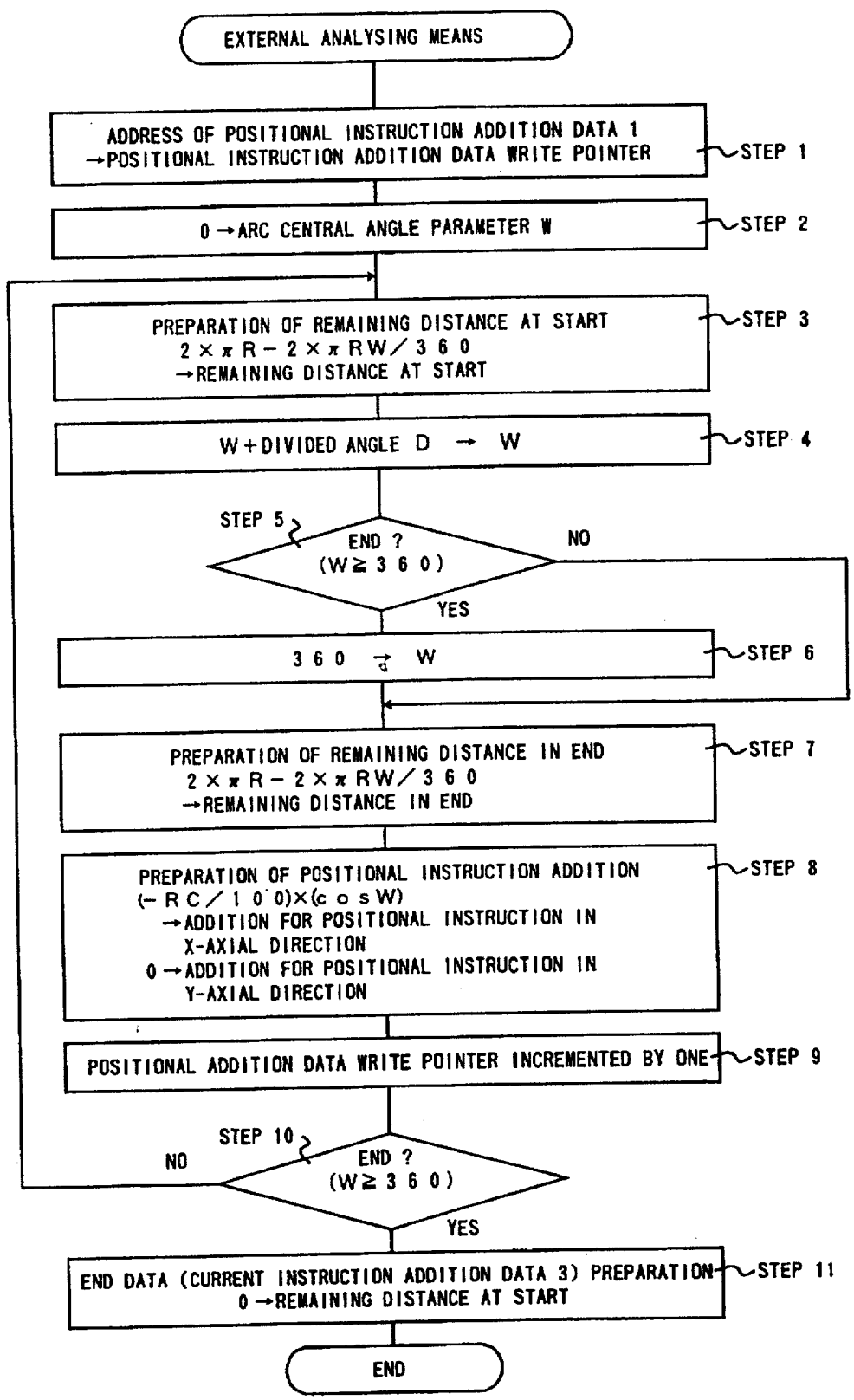
FIGS. 4A to 4C are flow charts and explanatory view showing operations for positional correction according to Embodiment 1 of the present invention.
Figure 4B:
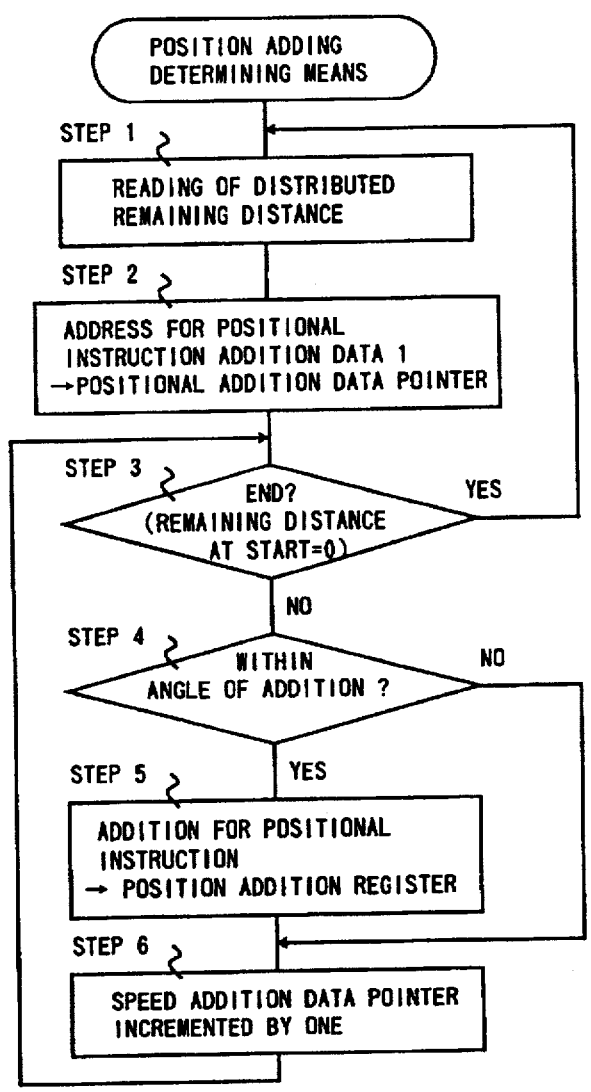
Figure 4C:
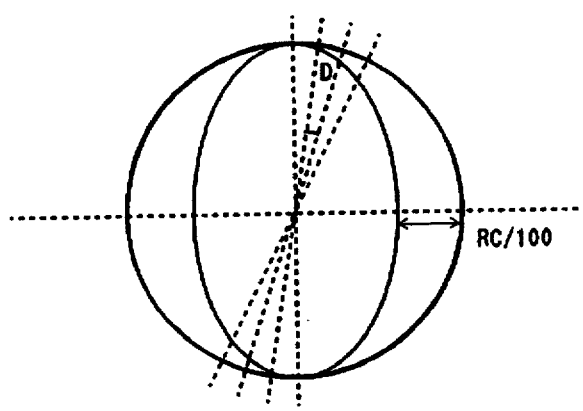

FIGS. 4A to 4C show the cases where an ellipse track is interpolated by changing lengths of the vertical axis and horizontal axis of an arc.

In this case, a positional instruction is corrected so that an instruction for a circle with a radius R is shrunk by C % in the X-axial direction. Correction is made by D degree so that correction can be made up to 360/D times.

FIG. 4C shows a range of correction decided by dividing an arc by an equal angle and a correction rate in each operation.

Positional instruction addition data set in analysis data is in a correction range of 360/D regions. Contents of positional instruction addition data of 0 (zero) is end data indicating that the positional instruction addition data has come to the end.

FIG. 4A is a flow chart for generation of positional instruction addition data by the internal analyzing means 34.

Step 1

An address for positional instruction addition data 1 is set in a positional instruction addition data write pointer.

Step 2

A default value of 0 is substituted into an arc central angle parameter w.

Step 3

A remaining distance at start for positional instruction addition data is generated. The remaining distance at start is $2\pi R - (2\pi RW/360)$.

Step 4

A divided angle D is added to the arc central angle parameter W.

Step 5

W is compared to 360, and checking for final division is executed. If W is not less than 360, the division is final. Otherwise system control branches to step 7.

Step 6

As it has been determined that the division is final, 360 is substituted into W.

Step 7

A remaining distance in end for positional instruction addition data is generated. The remaining distance in end is $2\pi R - (2\pi RW/360)$.

Step 8

Addition for a positional instruction for positional instruction addition data is generated. Addition for a positional instruction in the X-axial direction is $-RC/100*\cos W$. Addition for a positional instruction in the Y-axial direction is 0.

Step 9

A positional instruction addition data write pointer is incremented by one.

Step 10

Checking for end of division is executed. If W is 360, it indicates that division is complete. Otherwise system control branches to step 3.

Step 11

End data is written in the positional instruction addition data. The end data is generated by setting the remaining distance at start to 0.

FIG. 4B is a flow illustrating operations of the positional instruction addition determining means 17.

Step 1

A distributed remaining distance is read.

Step 2

An address for positional instruction addition data 1 is set in a read pointer for positional instruction addition data.

Step 3

The remaining distance at start is compared to 0, and determination is made as to whether operation has come to the end or not. If it is determined that the operation has come to the end, system control branches to step 1.

Step 4

The distributed remaining distance is compared to the remaining distance at start as well as to the remaining distance in end. If the distributed remaining distance is not more than the remaining distance at start and not less than the remaining distance in end, the distributed remaining distance is within a range of addition. Otherwise system control branches to step 6.

Step 5

Addition for a positional instruction in the X axial direction is copied to the X-axial positional instruction addition register. Also addition for a positional instruction in the Y-axial direction is copied to the Y-axial positional instruction addition register. Contents of this positional instruction addition register is added by the positional instruction adding means to a positional instruction, and the sum is outputted to the positional control means 4.

Step 6

The positional instruction addition data read pointer is incremented by one. Then system control branches to step 3.

Next description is made for Embodiment 2 of the present invention with reference to FIG. 5 to FIG. 9. It should be noted that this embodiment relates to inventions as described in claims 8 to 14.

Figure 5:
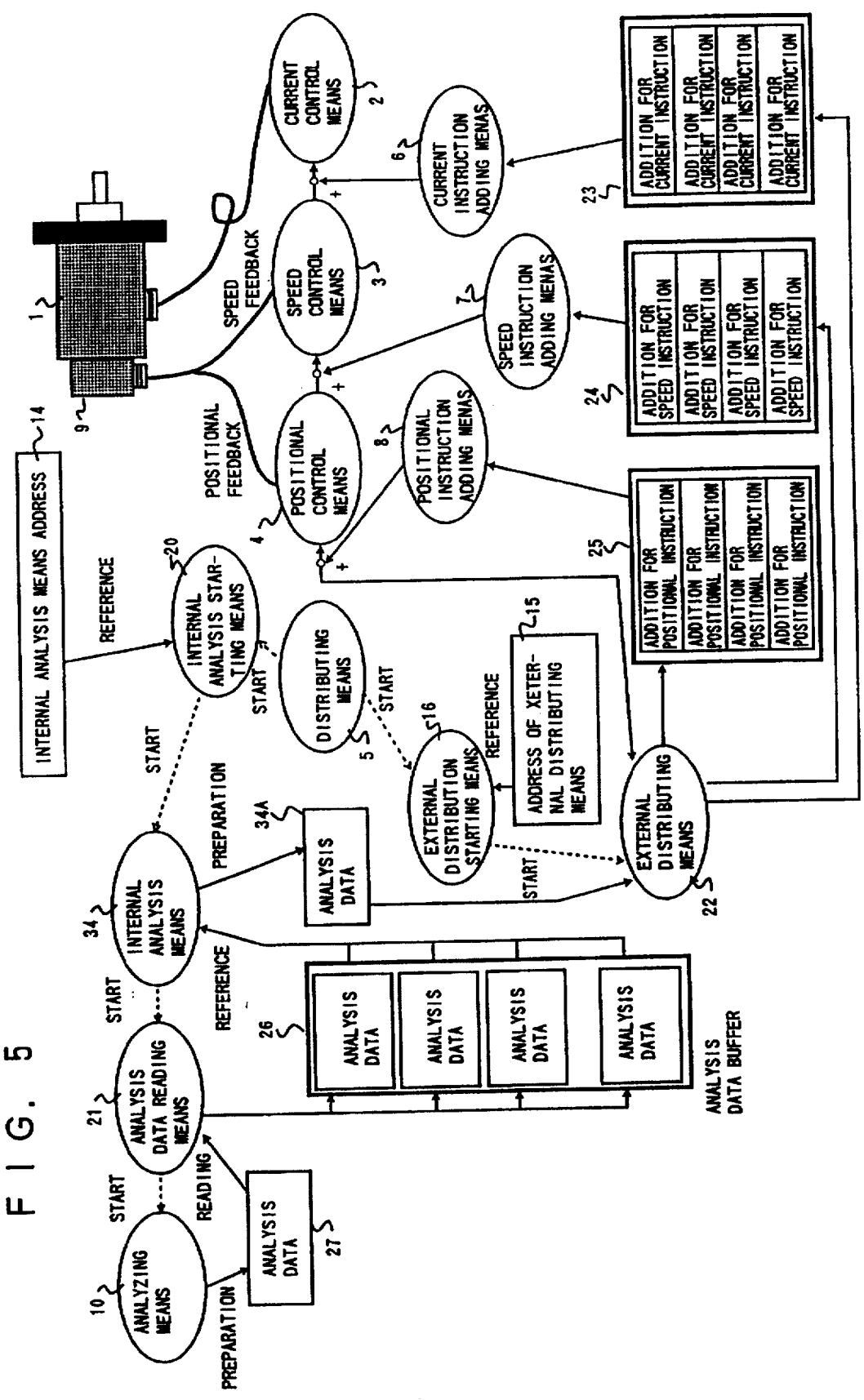
FIG. 5 is a processing block diagram of Embodiment 2 according to the present invention.

Namely in this embodiment, as shown in FIG. 5, provided inside the numerical control apparatus are an analysis data reading means 21, an analysis data buffer 26, an internal analyzing means 34, a buffer 34A for the internal analysis data, an internal analysis starting means 20, an internal analysis registering means 14, a positional instruction adding means 8, a speed instruction adding means 7, a current instruction adding means 6, an external distribution registering means 15, an external distribution starting means 16, an external distributing means 22, a current instruction addition buffer 23, a speed instruction addition buffer 24, and a positional instruction addition buffer 25.

The internal analyzing means 34 is provided so that it is located in terms of software between the analyzing means 10 and the distributing means 5 when registered by the internal analysis registering means 14, and the external distributing means 22 is provided so that it is located in terms of software between the analyzing means 10 and the positional control means 4 when registered by the external distribution registering means 15.

It should be noted that each means above is connected to each other by software.

Next, a description is made for functions and operations of each means.

Namely in FIG. 5, the distributing means 5 calls out the internal analysis starting means 20 when analysis data is required (for instance when a machine start button is pressed for machining).

The internal analysis starting means 20 starts operations of the internal analyzing means 34 by referring to an address of the internal analyzing means registered in the internal analysis registering means 14.

The internal analyzing means 34 refers to the analysis data buffer 26 to prepare analysis data to be delivered to the external distributing means 16, but if the reference data is short, starts operation of the analysis data reading means 21.

The analysis data reading means 21 starts operation of the analyzing means 10 to make it prepare analysis data 27. Furthermore it sets the prepared analysis data 27 in the analysis data buffer 26.

The internal analyzing means 34 refers to the analysis data buffer 26, prepares positional instruction addition data, speed instruction addition data, or current instruction addition data and sets the data together with analysis data analyzed by the analyzing means 10 in the buffer 34A for the internal analyzing means when the external distribution starting means 16 described above is not used, namely in a case of Embodiment 1, but in a case of this embodiment, as the external distribution starting means 16 is used, the analysis data analyzed by the analyzing means 10 is set as it is in the buffer 34A for the internal analyzing means.

The distributing means 5 does not execute a distributing function originally assigned to the means when the external distribution starting means 16 is used, namely in a case of this embodiment, and operates as a stating means for the external distribution starting means 16 as well as the internal analysis starting means 20.

The external distribution starting means 16 starts operations of the external distributing means 22 by referring to an address of the external distributing means registered in the external distribution registering means 15.

The external distributing means 22 executes distribution referring to analysis data stored in the buffer 34A for the internal analysis means and according to an instructed track and a speed instruction, and outputs a positional instruction to the positional control means 4. Also, addition for a positional instruction divided in a processing cycle of the positional control means 4 is computed according to the necessity, and the computed addition for a positional instruction in the positional instruction addition buffer 25. Similarly addition for a speed instruction divided in a processing cycle of the speed control means 3 is computed according to the necessity, and the computed addition for a speed instruction is set in the speed instruction addition buffer 24, and also addition for a current instruction divided in a processing cycle of the current control means 2 is computed and the computed addition for a current instruction is set in the current instruction addition buffer 23.

The positional instruction adding means 8 adds a positional instruction outputted from the distributing means 5 to addition for a positional instruction read from the positional instruction addition buffer 25, and outputs the sum to the positional control means 4 in synchronism to a processing cycle of the positional control means 4.

The positional control means 4 computes a speed instruction from a difference between a positional instruction and positional feedback from the detector 9, and outputs the speed instruction to the speed control means 3.

The speed instruction adding means 7 adds a speed instruction outputted from the positional control means 4 to addition for a speed instruction read from the speed instruction addition buffer 24, and outputs the sum to the speed control means 3 in synchronism to a processing cycle of the speed control means 3.

The speed control means 3 computes a current instruction from a difference between a positional instruction and speed feedback from the detector 9, and outputs the computed current instruction to the current control means 2.

The current instruction adding means 6 adds a current instruction outputted from the speed control means 3 to addition for a current instruction read from the current instruction addition buffer 23, and outputs the sum to the current control means 2 in synchronism to a processing cycle of the current control means 2.

The current control means controls a current to be given to the electric motor 1 according to a current instruction. The electric motor 1 drives a machine with its torque.

The detector 9 detects a position and a speed of the electric motor 1 and feeds the data back to the positional control means 4 as well as to the speed control means 3.

Figure 6A:
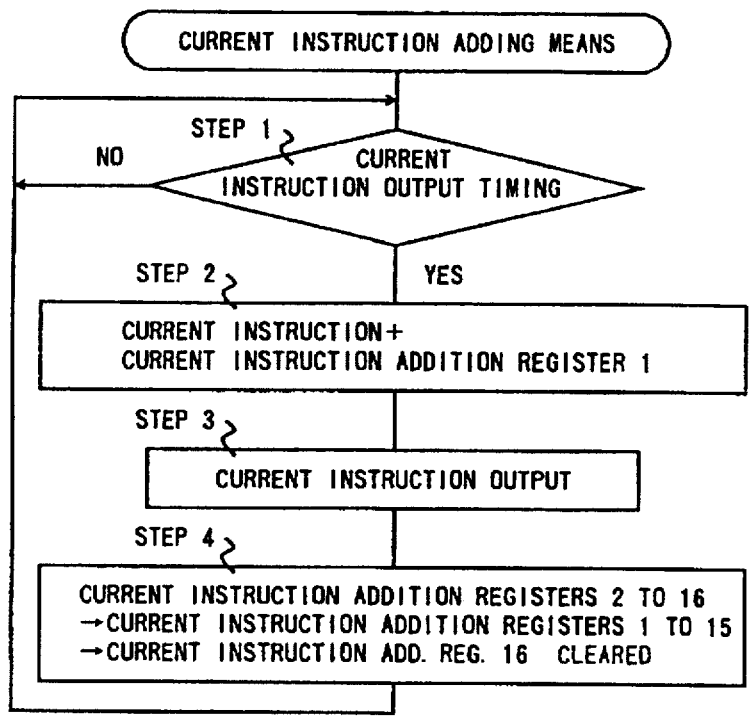
FIGS. 6A to 6C are flow charts showing operations for a current instruction adding means, a speed instruction adding means, and a positional instruction adding means according to Embodiment 2 of the present invention.

FIG. 6A is a flow illustrating operations of the current instruction adding means 6.

Herein the current instruction addition buffer 23 has 16 pieces of element, and each is called a current instruction addition registers 1 to 16 respectively.

The current instruction adding means 6 computes and outputs a next current instruction each time the current control means 2 receives a current instruction.

Step 1

Whether the current control means 2 has received a current instruction or not is checked. If not received system control branches to step 1.

Step 2

Contents of the current instruction addition register 1 is read and added to a current instruction.

Step 3

A result is outputted to the current control means 2.

Step 4

Contents stored in the current instruction addition register 2 in the current instruction addition buffer 23 is copied to the current instruction addition register 16, and also contents stored in the current instruction addition register 1 is copied to the current addition register 15. The current instruction addition register 16 is cleared. System control branches to step 1.

Figure 6B:
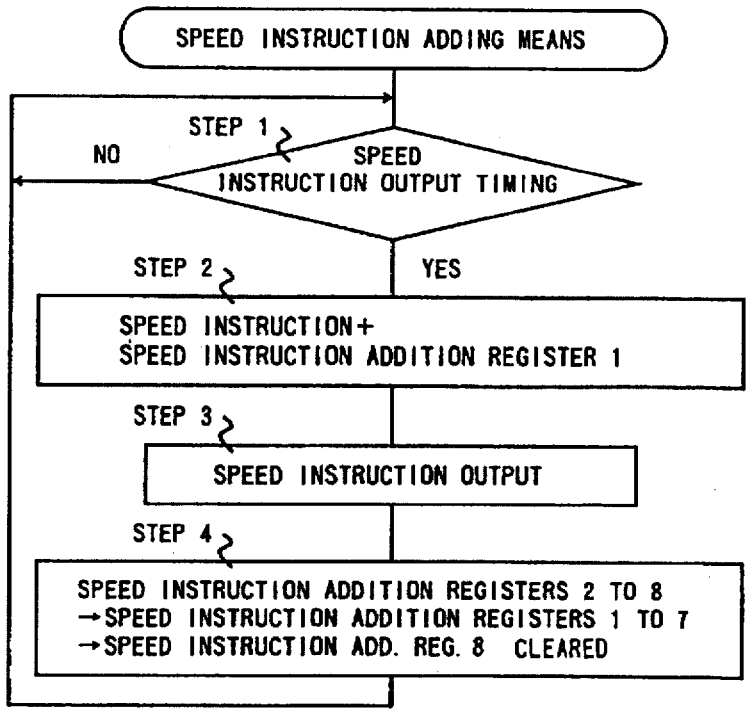

FIG. 6B is a flow illustrating operations of the speed instruction adding means.

Herein, the speed instruction addition buffer 24 has 8 elements, and each is read a speed instruction addition registers 1 to 8 respectively.

The speed instruction adding means 7 computes and outputs a next speed instruction each time the speed control means 3 receives a speed instruction.

Step 1

Whether the speed control means has received a speed instruction or not is checked. If not, system control branches to step 1.

Step 2

Contents of the speed instruction addition register 1 is called and added to a speed instruction.

Step 3

A result is outputted to the speed control means.

Step 4

Contents stored in the speed instruction addition register 2 in the speed instruction addition buffer is copied to the speed instruction addition register 8, and also contents stored in the speed instruction addition register 1 is copied to the speed instruction addition register 7. The speed instruction addition register 8 is cleared. System control branches to step 1.

Figure 6C:
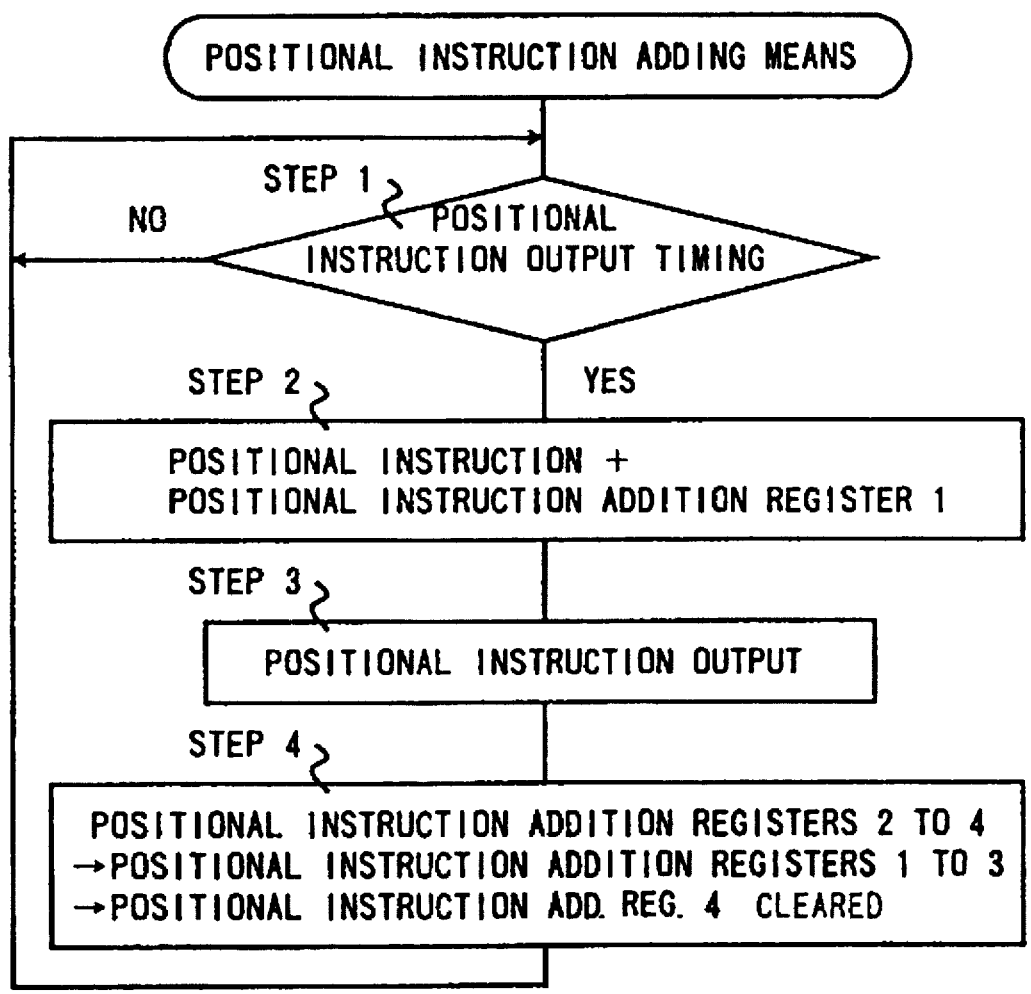

FIG. 6C is a flow illustrating operations of the positional instruction adding means.

Herein the positional instruction addition buffer 25 has 4 pieces of element, and each is called a positional instruction addition registers 1 to 4 respectively.

The positional instruction adding means 8 computes and outputs a next positional instruction each time the positional control means 4 receives a positional instruction.

Step 1

Whether the positional control means has received a positional instruction or not is checked. If not, system control branches to step 1.

Step 2

Contents of the positional instruction addition register 1 is read and added to a positional instruction.

Step 3

A result is outputted to the positional control means.

Step 4

Contents stored in the positional instruction addition register 2 in the positional instruction addition buffer is copied to the positional instruction addition register 4, and also contents stored in the positional instruction addition register 1 is copied to the positional instruction addition register 3. The positional instruction addition register 4 is cleared. System control branches to step 1.

Figure 7A:
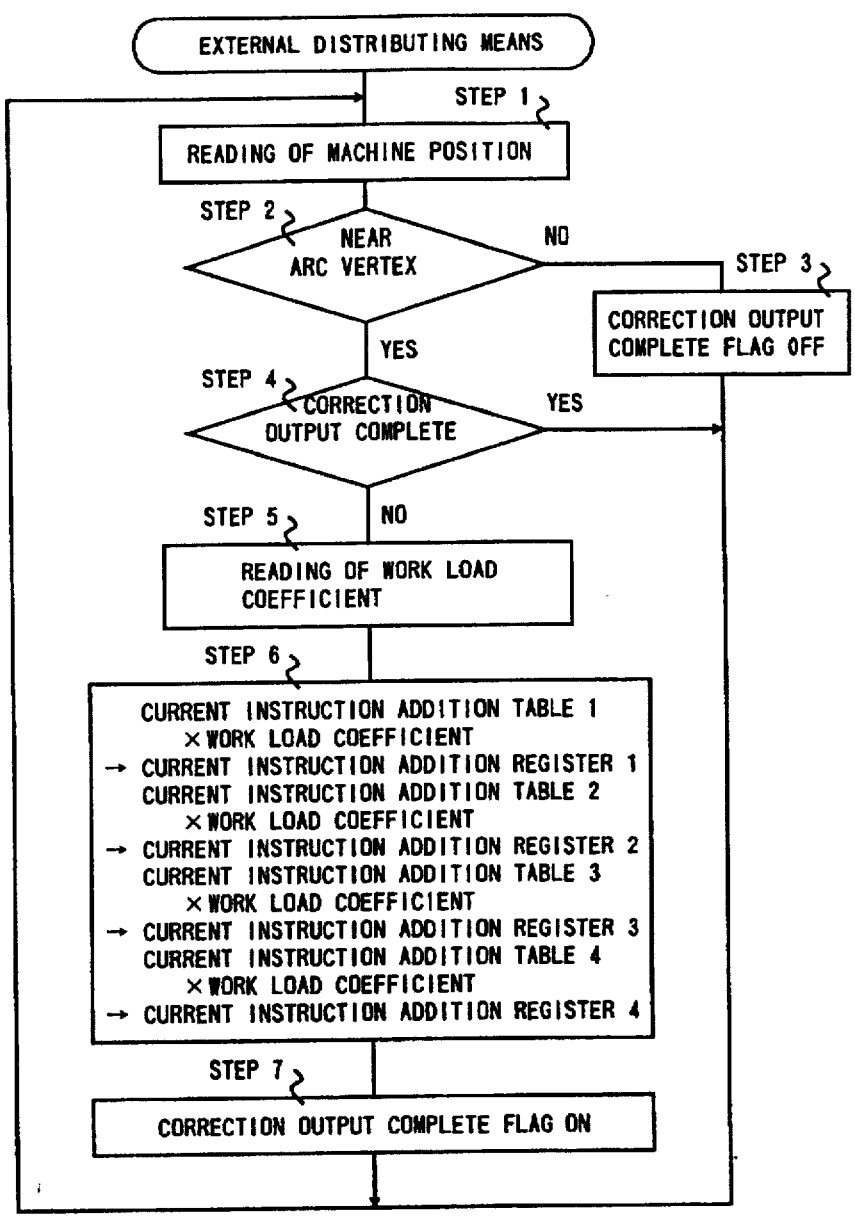
FIGS. 7A and 7B are flow chart and explanatory view showing operations for current correction according to Embodiment 2 of the present invention.
Figure 7B:
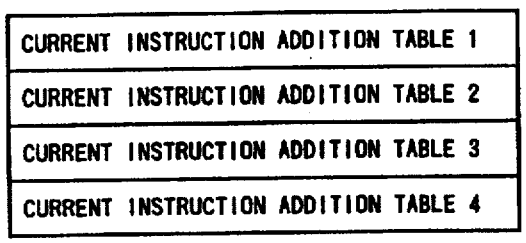

FIGS. 7A and 7B show the cases like that shown in FIGS. 2A to 2D where lost motion near a border between quadrants in an instruction for circular movement is reduced by correcting a current instruction.

FIG. 7B is a memory in which a standard value of addition for a current instruction to be corrected at a border between quadrants in an instruction for circular movement is stored. In this example, some kind of correction is added up to 4 processing cycles of the current control means 2. Also addition for a current instruction is experimentally set according to a response from an object machine system to be controlled when a certain work load is given. For this reason, actual addition for a current instruction is computed by multiplying this standard value by a work load coefficient. Furthermore, this work load coefficient is given experimentally.

FIG. 7A is a flow illustrating a processing for obtaining addition for a current instruction with the external distributing means.

Step 1

Positional instructions in the X-axial and Y axial directions are read.

Step 2

Whether a positional instruction is near a vertex of an arc or not is checked. If not, system control branches to step 3. Whether an instructed position is near a vertex of an arc or not is checked by determining, for instance, whether signs in the X-axial direction and Y-axial direction has been reverted or not.

Step 3

The current instruction addition output complete flag is turned OFF. System control branches to step 1.

Step 4

The current instruction addition output complete flag is checked. If already outputted, system control branches to step 1.

Step 5

A work load coefficient set according to weight of a work is read.

Step 6

Addition for a current instruction to be added is set in the current instruction addition tables 1 to 4. The current instruction addition registers 1 to 4 are elements of the current instruction addition buffer 23.

Contents of the current instruction addition table 1 is read and multiplied by the work load coefficient, and the result is stored in the current instruction addition register 1.

Contents of the current instruction addition table 2 is read and multiplied by a work load coefficient, and the result is stored in the current instruction addition register 2.

Contents of the current instruction addition table 2 is read and multiplied by a work load coefficient, and the result is stored in the current instruction addition register 3.

Contents of the current instruction addition table 2 is read and multiplied by a work load coefficient, and the result is stored in the current instruction addition register 4.

Step 7

The current instruction addition output complete flag is turned ON. System control branches to step 1.

FIG. 8 shows a case like that shown in FIG. 3 where a time required for positioning is shortened by speed feed forward.

The speed feed forward has the effect that follow-up error in an electric motor can be reduced, but also has the defect that mechanical vibration is easily generated.

The feed forward rate generating vibration varies according to running conditions of a machine, so that it is desired that the feed forward rate is changed according to the running conditions.

In this case, a feed forward rate computed not from a speed, but by multiplying a speed by a work load coefficient is added. This work load coefficient is given experimentally according to a machine system to be controlled.

FIG. 8 is a flow illustrating a processing for computing addition for a speed instruction with an external distributing means.

Step 1

The previous current instruction is subtracted from the current positional instruction for computing an instructed speed.

Step 2

The current positional instruction is stored in a memory.

Step 3

The feed mode (positioning mode, cutting mode) is read.

Step 4

If the feed mode is a cutting mode, system control branches to step 5.

Step 5

0 is outputted to the speed instruction addition register. System control branches to step 1.

Step 6

A work load coefficient previously set according to weight of a work is read.

Step 7

A speed instruction is multiplied by a work load coefficient, and the product is outputted to the speed instruction addition register. All elements of the speed instruction addition buffer are speed instruction addition registers. System control branches to step 1.

Figure 9:
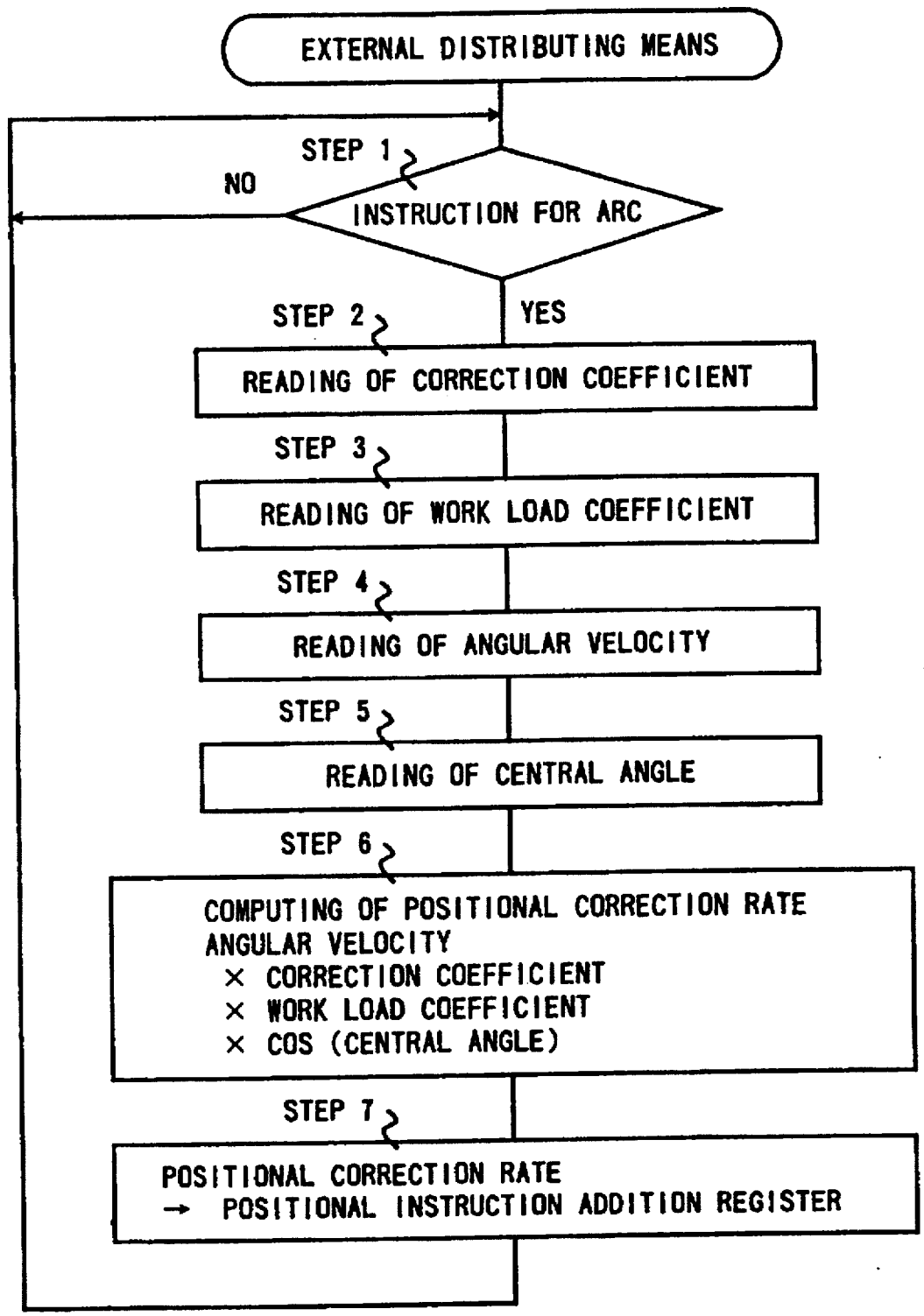
FIG. 9 is a flow chart illustrating operations for positional correction according to Embodiment 2 of the present invention.
Figure 10:
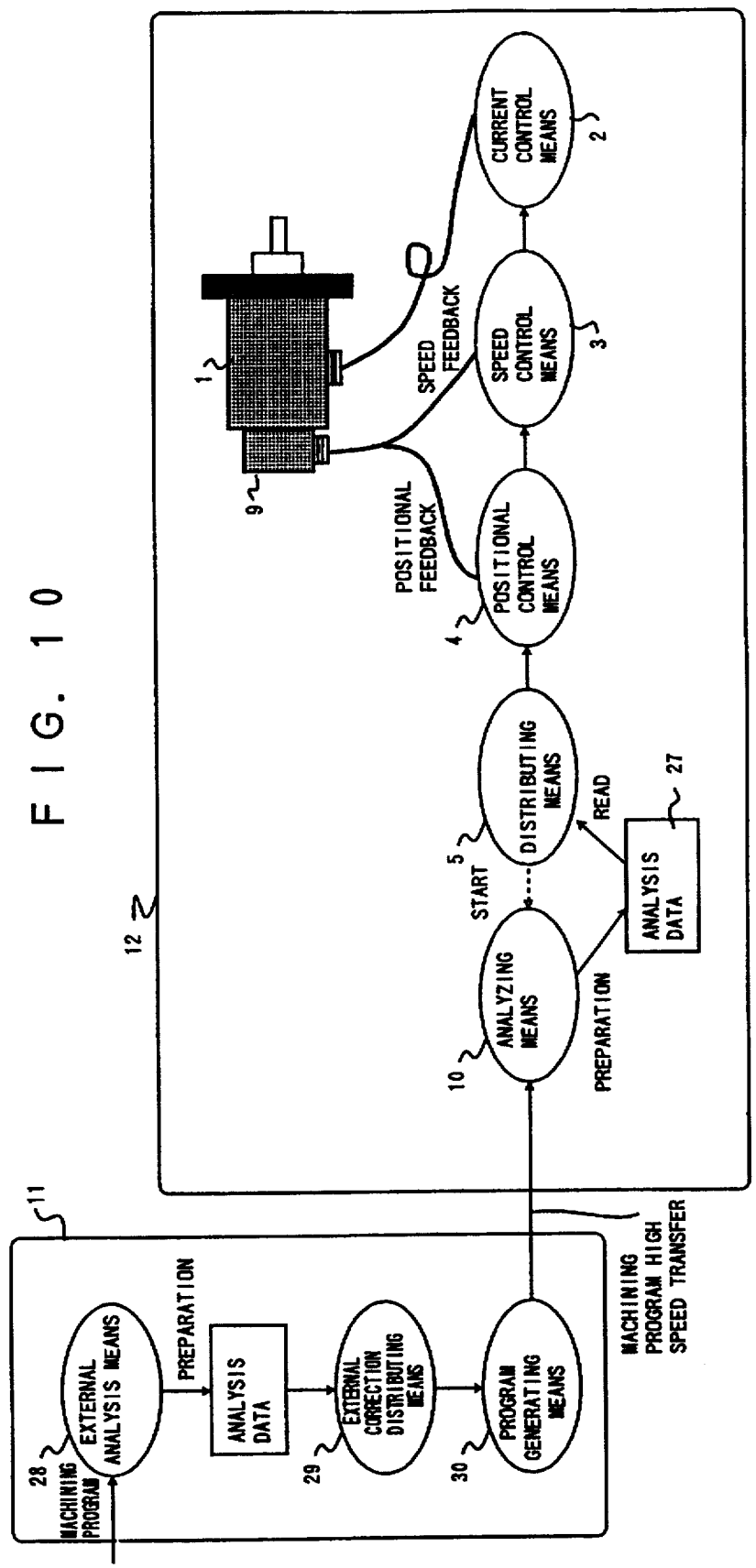
FIG. 10 is a processing block diagram for a numerical control unit having a conventional type of a correcting function for high speed and high precision machining.
Figure 11:
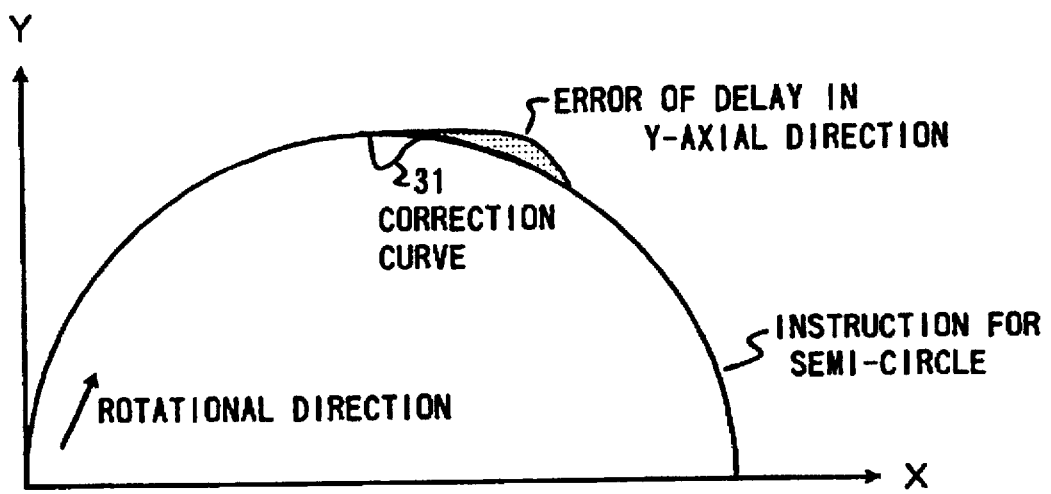
FIG. 11 is an explanatory view of a difference at a border on quadrants of an arc and a corrected track made by the numerical control apparatus.
Figure 12A:
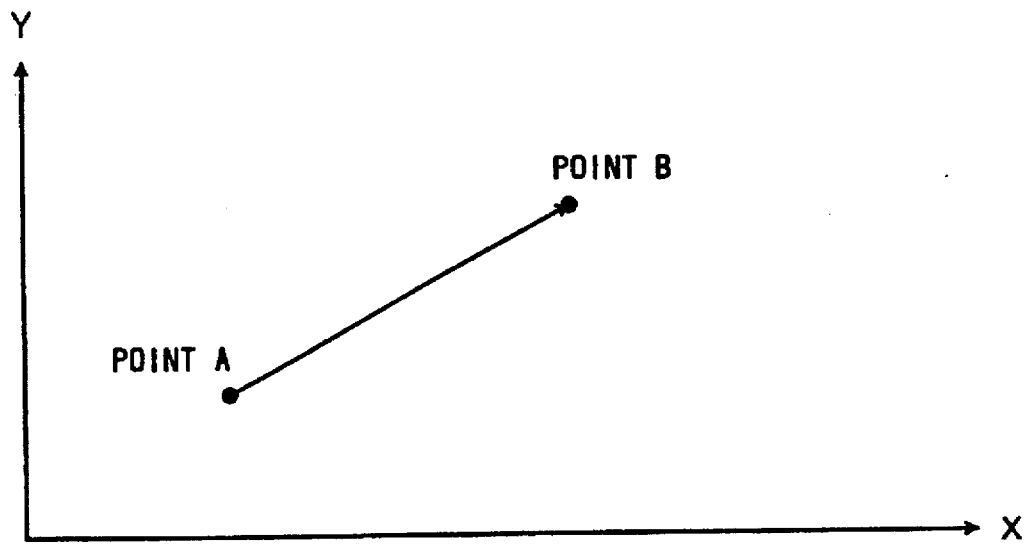
FIGS. 12A and 12B are explanatory views of a corrected track for high speed positional decision by the numerical control apparatus.
Figure 12B:
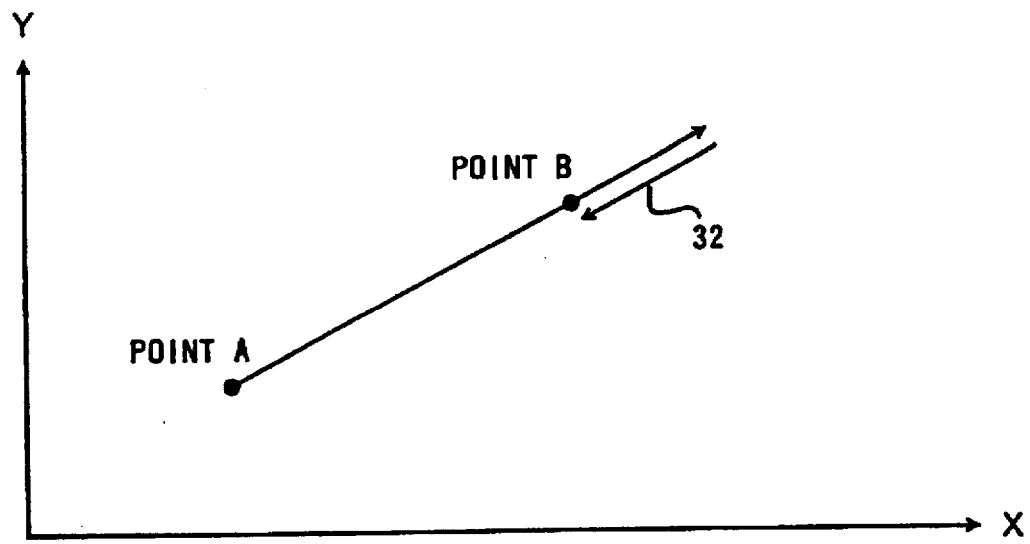
Figure 13:
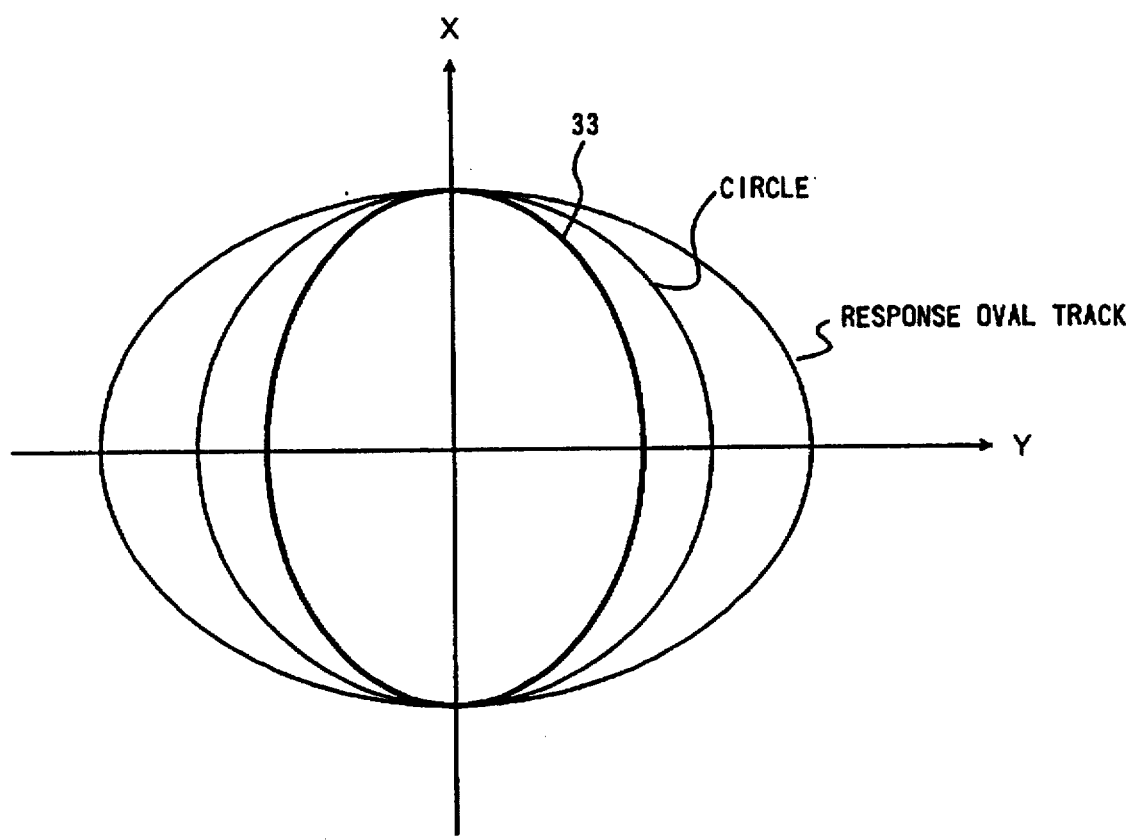
FIG. 13 is an explanatory view of a corrected track for modifying oval shaped distortion of arc by the numerical control apparatus.

FIG. 9 shows an embodiment of interpolation for an ellipse like in FIG. 4C.

Like in the embodiment shown in FIGS. 4(A,B,C), this interpolation is realized by changing positions in the vertical and horizontal axes according to a central angle of an arc.

A shape of a work is deformed due to imbalance between rigidity of a machine in the vertical direction and that in the horizontal direction, so that it is desirable to execute correction by changing an angular velocity of an arc or a work load.

In this case, a correction rate is changed according to a correction coefficient, an angular velocity, or a work load coefficient.

This correction coefficient or a work load coefficient is experimentally given to a machine system to be controlled.

FIG. 9 is a flow illustrating a processing for a correction rate for a positional instruction with the external distributing means.

Step 1

Whether an instruction is for an arc or not is checked. If not, system control branches to step 1.

Step 2

A correction coefficient previously set is read out. A correction rate for an arc is in proportion to an angular velocity, but a correction coefficient is a proportional coefficient for an angular velocity and a correction rate.

Step 3

A work load coefficient previously set according to weight of a work is read.

Step 4

An angular velocity of an arc is read out.

Step 5

A central angle of an art at the current position is read out.

Step 6

Addition for a positional instruction is computed. A correction coefficient, a work load coefficient, an angular velocity, and cosine of a central angle are multiples by each other.

Step 7

The computed addition for a positional instruction is outputted to the positional instruction addition register. System control branches to step 1.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A numerical control method for a numerical control apparatus having:

an analyzing means for analyzing a machining program;

a distributing means for distributing an instructed track according to analysis data from said analyzing means;

a positional control means for controlling a position of an electric motor according to an output from said distributing means;

a speed control means for controlling a speed of said electric motor according to an output from said positional control means; and a current control means for controlling a current for said electric motor according to an output from said speed control means comprising the steps of:

outputting the analysis data from said analyzing means to said distributing means;

computing at least one of addition for positional instruction, addition for speed instruction and addition for current instruction according to analysis data from said analyzing means; and adding the computed addition at a desired time to specified output from said distributing means and from subsequent means thereafter for controlling said electric motor.

2. A numerical control method for a numerical control apparatus having:

an analyzing means for analyzing a machining program;

a distributing means for distributing an instructed track according to analysis data from said analyzing means;

a positional control means for controlling a position of an electric motor according to an output from said distributing means;

a speed control means for controlling a speed of said electric motor according to an output from said positional control means; and a current control means for controlling a current for said electric motor according to an output from said speed control means comprising the steps of:

outputting the analysis data from said analyzing means to said distributing means;

computing a range of addition for at least one of the positional instruction, speed instruction and current instruction on the instructed track according to analysis data from said analyzing means;

computing at least one of addition for the positional instruction, addition for the speed instruction and addition for the current instruction according to analysis data from said analyzing means;

comparing the current position to said range of addition; and adding said computed addition to a specified output from said distributing means and from subsequent means thereafter for controlling said electric motor, if it is determined that said current position is within a range for addition.

3. A numerical control method according to claim 2, wherein specification of said range of addition is executed with an interpolated remaining distance up to an end point of an instructed block.

4. A numerical control apparatus comprising:

an analyzing means for analyzing a machining program;

a distributing means for distributing an instructed track according to analysis data from said analyzing means;

a positional control means for controlling a position of an electric motor according to an output from said distributing means;

a speed control means for controlling a speed of said electric motor according to an output from said positional control means;

and a current control means for controlling a current for said electric motor according to an output from said speed control means;

an internal analyzing means located between said analyzing means and said distributing means in terms of software for computing at least one of addition for positional instruction, addition for speed instruction and addition for current instruction according to analysis data from said analyzing means; and an adding means for adding the addition computed by said internal analyzing means to a specified output from said distributing means or from subsequent means thereafter at a desired point of time.

5. A numerical control apparatus according to claim 4, further comprising a registering means for registering said internal analyzing means between said analyzing means and said distributing means in terms of software is provided.

6. A numerical control apparatus comprising:

an analyzing means for analyzing a machining program;

a distributing means for distributing an instructed track according to analysis data from said analyzing means;

a positional control means for controlling a position of an electric motor according to an output from said distributing means;

a speed control means for controlling a speed of said electric motor according to an output from said positional control means;

a current control means for controlling a current for said electric motor according to an output from this speed control means;

an internal analyzing means located between said analyzing means and said distributing means in terms of software for computing a range of addition for at least one of the positional instruction, speed instruction and current instruction on the instructed track according to analysis data from said analyzing means as well as at least one of addition for positional instruction, addition for speed instruction, and addition for current instruction;

an addition determining means for making a determination as to whether the current position is within a range of addition or not by referring to the current position as well as to said range of addition; and an adding means for adding the addition computed by said internal analyzing means to a specified output from said distributing means or from any subsequent means thereafter when, as a result of determination by said addition determining means, the current position is within a range of addition.

7. A numerical control apparatus according to claim 6, further comprising a registering means for registering said internal analyzing means between said analyzing means and said distributing means in terms of software is provided.

8. A numerical control apparatus according to claim 6, wherein specification of said range of addition is executed by specifying an interpolated remaining distance up to an end point of an instructed block.

9. A numerical control method for a numerical control apparatus having:

a analyzing means for analyzing a machining program;

a positional control means receiving analysis data from said analyzing means for controlling a position of an electric motor;

a speed control means for controlling a speed of said electric motor according to an output from said positional control means; and a current control means for controlling a current for said electric motor according to an output from said speed control means comprising the steps of:

outputting a positional instruction to said positional control means by distributing an instructed track according to analysis data from said analyzing means;

computing addition for a divided current instruction in a processing cycle of said current control means; and adding addition for the current instruction computed to an output from said speed control means in a processing cycle of said current control means for controlling said electric motor.

10. A numerical control method for a numerical control apparatus having:

a analyzing means for analyzing a machining program;

a positional control means receiving analysis data from said analyzing means for controlling a position of an electric motor;

a speed control means for controlling a speed of said electric motor according to an output from said positional control means; and a current control means for controlling a current for said electric motor according to an output from said speed control means comprising the steps of:

outputting a positional instruction to said positional control means by distributing an instructed track according to analysis data from said analyzing means;

computing addition for a divided speed instruction in a processing cycle of said speed control means; and adding addition for the speed instruction computed to an output from said positional control means in a processing cycle of said speed control means for controlling said electric motor.

11. A numerical control method for a numerical control apparatus having:

a analyzing means for analyzing a machining program;

a positional control means receiving analysis data from said analyzing means for controlling a position of an electric motor;

a speed control means for controlling a speed of said electric motor according to an output from said positional control means; and a current control means for controlling a current for said electric motor according to an output from said speed control means comprising the steps of:

outputting a positional instruction to said positional control means by distributing an instructed track according to analysis data from said analyzing means;

computing addition for a divided positional instruction in a processing cycle of said positional control means; and adding addition for the positional instruction computed to an output before entering said positional control means in a processing cycle of said positional control means for controlling said electric motor.

12. A numerical control apparatus comprising:

a analyzing means for analyzing a machining program;

a positional control means receiving analysis data from said analyzing means for controlling a position of an electric motor;

a speed control means for controlling a speed of said electric motor according to an output from said positional control means;

a current control means for controlling a current for said electric motor according to an output from said speed control means;

an external distributing means provided in terms of software between said analyzing means and said positional control means for outputting a positional instruction to said positional control means by distributing an instructed track according to analysis data from said analyzing means and also computing the divided addition of the current instruction in a processing cycle of said current control means;

a storage means for storing said addition for the current instruction computed; and a current instruction adding means for adding the addition for current instruction stored in said storage means to an output from said speed control means in a processing cycle of said current control means.

13. A numerical control apparatus according to any of claim 12, further comprising a registering means for registering said external distributing means between said analyzing means and said positional control means in terms of software.

14. A numerical control apparatus comprising:

a analyzing means for analyzing a machining program;

a positional control means receiving analysis data from said analyzing means for controlling a position of an electric motor;

a speed control means for controlling a speed of said electric motor according to an output from said positional control means; and a current control means for controlling a current for said electric motor according to an output from said speed control means; and an external distributing means provided in terms of software between said analyzing means and said positional control means for outputting a positional instruction to said positional control means by distributing an instructed track according to analysis data from said analyzing means and also computing the divided addition for the speed instruction in a processing cycle of said speed control means;

a storage means for storing addition for the current instruction computed; and a speed instruction adding means for adding addition for the speed instruction stored in said storage means to an output from said positional control means in a processing cycle of said speed control means.

15. A numerical control apparatus according to claim 14, further comprising a registering means for registering said external distributing means between said analyzing means and said positional control means in terms of software.

16. A numerical control apparatus comprising:

a analyzing means for analyzing a machining program;

a positional control means receiving analysis data from said analyzing means for controlling a position of an electric motor;

a speed control means for controlling a speed of said electric motor according to an output from said positional control means; and a current control means for controlling a current for said electric motor according to an output from said speed control means;

an external distributing means provided in terms of software between said analyzing means and said positional control means for outputting a positional instruction to said positional control means by distributing an instructed track according to analysis data from said analyzing means and also computing the divided addition for the positional instruction in a processing cycle of said positional control means;

a storage means for storing addition for the positional instruction computed; and a positional instruction adding means for adding addition for positional instruction stored in said storage means to an output from said external distributing means in a processing cycle of said positional control means.

17. A numerical control apparatus according to claim 16, further comprising a registering means for registering said external distributing means between said analyzing means and said positional control means in terms of software.

* * * * *